US009203264B2

(12) United States Patent  (10) Patent No.: US 9,203,264 B2
Cano et al.  (45) Date of Patent: Dec. 1, 2015

(54) HYDROGEN PURGE SYSTEM, COMPUTER PROGRAM PRODUCT AND RELATED METHOD

(75) Inventors: Luis Fernando Magana Cano, Queretaro (MX); Manvinder Singh Chhatwal, Greenville, SC (US); Nicola Piccirillo, Scotia, NY (US); Robert Samuel Rodick, Scotia, NY (US); Ravishankar Bagalur Sampangiramaiah, Schenectady, NY (US); Jose Donaciano Estrada Zepeda, Queretaro (MX)

(73) Assignee: General Electric Company, Schenectady, NY (US)

( * ) Notice: Subject to any disclaimer, the term of this patent is extended or adjusted under 35 U.S.C. 154(b) by 856 days.

(21) Appl. No.: 13/482,506

(22) Filed: May 29, 2012

(65) Prior Publication Data

US 2013/0320785 A1  Dec. 5, 2013

(51) Int. Cl.
*H02H 5/04* (2006.01)
*H02J 9/00* (2006.01)
*H02J 9/06* (2006.01)

(52) U.S. Cl.
CPC ... *H02J 9/06* (2013.01); *Y02E 60/50* (2013.01)

(58) Field of Classification Search
CPC ....... H02H 7/093; H02H 7/0833; H02H 7/09; H02H 7/08
USPC .......................................................... 361/23
See application file for complete search history.

(56) References Cited

U.S. PATENT DOCUMENTS

| 210,754 | A | | 12/1878 | Conklin |
| 3,702,965 | A | * | 11/1972 | Drexler et al. ................ 322/25 |
| 3,805,157 | A | | 4/1974 | Acks et al. |
| 4,156,846 | A | * | 5/1979 | Harrold et al. ........... 324/765.01 |
| 4,388,618 | A | | 6/1983 | Finger |
| 4,740,754 | A | | 4/1988 | Finger |
| 4,947,123 | A | | 8/1990 | Minezawa |
| 4,952,862 | A | | 8/1990 | Biagetti et al. |
| 4,968,941 | A | | 11/1990 | Rogers |
| 5,179,340 | A | | 1/1993 | Rogers |
| 5,371,682 | A | * | 12/1994 | Levine et al. ................... 702/63 |
| 5,444,378 | A | | 8/1995 | Rogers |
| 5,631,540 | A | | 5/1997 | Nguyen |
| 5,936,383 | A | | 8/1999 | Ng et al. |
| 5,977,750 | A | | 11/1999 | Ng et al. |
| 6,137,292 | A | | 10/2000 | Hirsch et al. |
| 6,242,891 | B1 | | 6/2001 | Parsonage |
| 6,469,471 | B1 | | 10/2002 | Anbuky et al. |
| 7,072,871 | B1 | * | 7/2006 | Tinnemeyer ................... 706/1 |
| 7,348,761 | B2 | | 3/2008 | Sato |
| 2007/0210754 | A1 | | 9/2007 | Sato |
| 2011/0210629 | A1 | * | 9/2011 | Antalek et al. ................ 310/56 |

* cited by examiner

*Primary Examiner* — Eduardo Colon Santana
*Assistant Examiner* — Gabriel Agared
(74) *Attorney, Agent, or Firm* — Ernest G. Cusick; Hoffman Warnick LLC.

(57) ABSTRACT

Various embodiments of the invention include systems, computer program products, and related methods for managing the purging of a hydrogen-cooled dynamoelectric machine. In various embodiments, a system is disclosed including at least one computing device configured to perform the following: obtain an indication of a fault in an alternating current (AC) power supply to a hydrogen-cooled dynamoelectric machine system; determine a reserve power characteristic of a reserve energy storage device in response to obtaining the indication of the fault in the AC power supply; and extend a pre-purge cycle for the hydrogen-cooled dynamoelectric machine system based upon the reserve power characteristic of the reserve energy storage device.

19 Claims, 4 Drawing Sheets

US 9,203,264 B2

HYDROGEN PURGE SYSTEM, COMPUTER PROGRAM PRODUCT AND RELATED METHOD

FIELD OF THE INVENTION

The subject matter disclosed herein relates to dynamoelectric machines. More particularly, aspects of the disclosure relate to hydrogen-cooled dynamoelectric machines.

BACKGROUND OF THE INVENTION

Many dynamoelectric machines, such as electric generators, are cooled using hydrogen. Hydrogen can be an efficient medium for transferring the heat produced within these dynamoelectric machines to an outlet. However, the pumps which supply hydrogen to the dynamoelectric machine can be subject to power losses. Predicting and managing this loss of power can present certain challenges.

BRIEF DESCRIPTION OF THE INVENTION

Various embodiments of the invention include systems, computer program products, and related methods for managing the purging of a hydrogen-cooled dynamoelectric machine. In various embodiments, a system is disclosed including at least one computing device configured to perform the following: obtain an indication of a fault in an alternating current (AC) power supply to a hydrogen-cooled dynamoelectric machine system; determine a reserve power characteristic of a reserve energy storage device in response to obtaining the indication of the fault in the AC power supply; and extend a pre-purge cycle for the hydrogen-cooled dynamoelectric machine system based upon the reserve power characteristic of the reserve energy storage device.

A first aspect of the invention includes a system having at least one computing device configured to perform the following: obtain an indication of a fault in an alternating current (AC) power supply to a hydrogen-cooled dynamoelectric machine system; determine a reserve power characteristic of a reserve energy storage device in response to obtaining the indication of the fault in the AC power supply; and extend a pre-purge cycle for the hydrogen-cooled dynamoelectric machine system based upon the reserve power characteristic of the reserve energy storage device.

A second aspect of the invention includes a computer-implemented method including: obtaining an indication of a fault in an alternating current (AC) power supply to a hydrogen-cooled dynamoelectric machine system; determining a reserve power characteristic of a reserve energy storage device in response to obtaining the indication of the fault in the AC power supply; and extending a pre-purge cycle for the hydrogen-cooled dynamoelectric machine system based upon the reserve power characteristic of the reserve energy storage device.

A third aspect of the invention includes a computer program product stored on a computer readable storage medium, which when executed by at least one computing device, causes the at least one computing device to: obtain an indication of a fault in an alternating current (AC) power supply to a hydrogen-cooled dynamoelectric machine system; determine a reserve power characteristic of a reserve energy storage device in response to obtaining the indication of the fault in the AC power supply; and extend a pre-purge cycle for the hydrogen-cooled dynamoelectric machine system based upon the reserve power characteristic of the reserve energy storage device.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
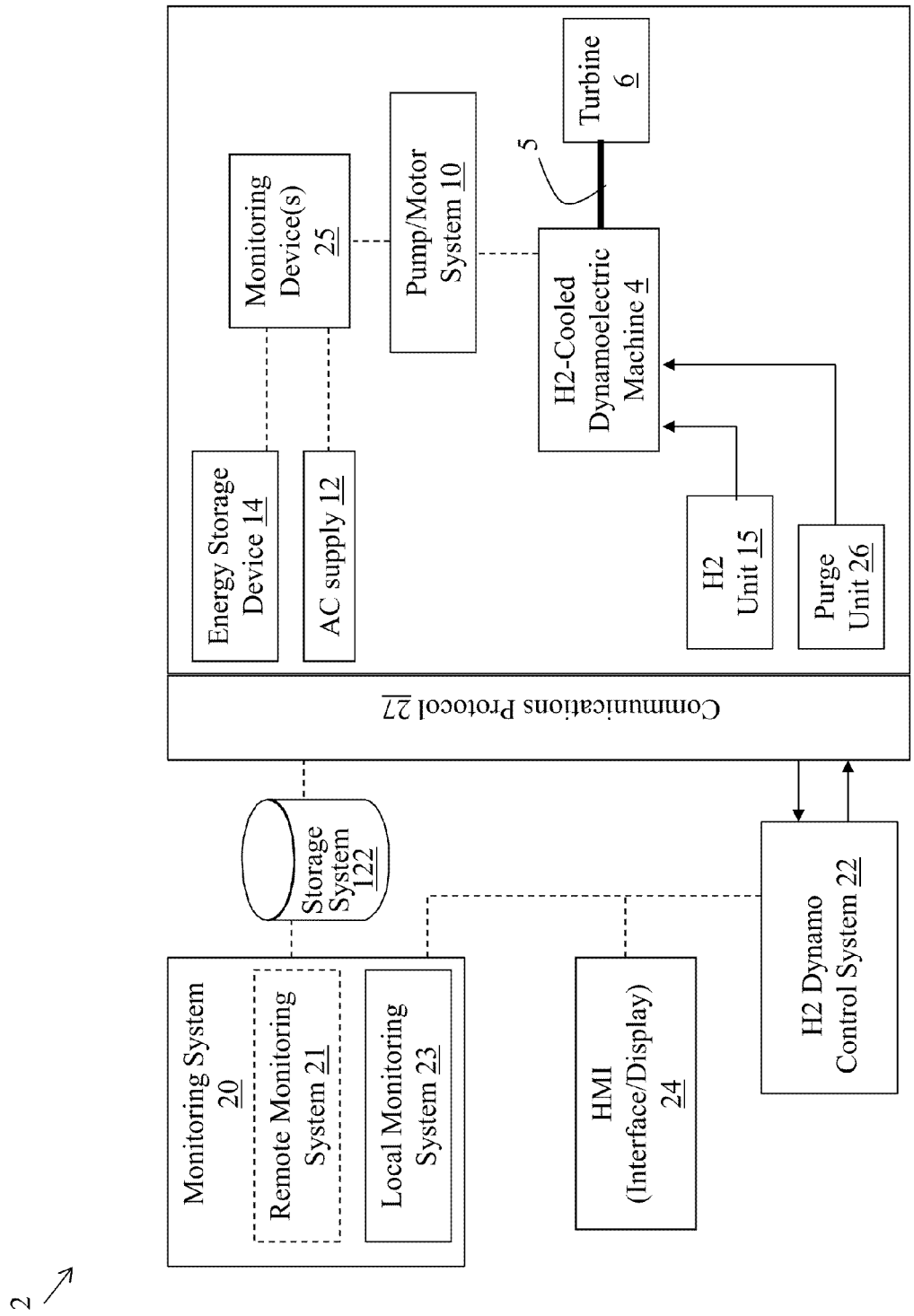
FIG. 1 shows a schematic depiction of a system according to various embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted herein, the subject matter disclosed relates to hydrogen-cooled dynamoelectric machines. More particularly, aspects of the disclosure relate to control systems, computer program products, and control methods for hydrogen-cooled dynamoelectric machines. Various embodiments of the systems include monitoring devices used which monitor a reserve energy storage device for the dynamoelectric machine.

As described herein, many dynamoelectric machines, such as electric generators, are cooled using hydrogen. Hydrogen can be an efficient medium for transferring the heat produced within these dynamoelectric machines to an outlet. However, the hydrogen used to cool these dynamoelectric machines is traditionally supplied by way of a hydrogen unit, which runs primarily on alternating current (AC) power. Where the AC power is lost, providing sufficient hydrogen (and at a sufficient pressure) can become difficult.

Typically, upon loss of AC power, hydrogen unit AC pumps are tripped, and traditional control systems engage reserve power, by way of direct current (DC) power. In this case, the dynamoelectric machine is said to be functioning under "failure mode" conditions. At this time, the DC pumps (e.g., DC lube oil pumps (DCLOP) and emergency seal oil pumps (DCSOP), respectively) are turned on and run according to a fixed schedule. Purging the dynamoelectric machine, according to the conventional approaches, can waste valuable hydrogen and $CO_2$, as well as time, because the dynamoelectric machine is restricted from running again until completion of the purge/refill process. Various embodiments of the invention can avoid some of these wasteful practices associated with the conventional approaches.

In contrast to the conventional approaches, various embodiments of the invention include systems, computer program products and related methods which delay the purging of hydrogen from the hydrogen-cooled dynamoelectric machine during the failure mode scenario. That is, various embodiments of the invention include approaches for monitoring at least one of a DC battery voltage, current, or battery enclosure temperature to determine an amount of power remaining in the DC battery. Based upon that determined amount of power remaining in the DC battery, the approaches according to various embodiments can extend the pre-purge cycle (running of the DCLOP beyond the conventionally fixed 20-minute mark) to delay, and potentially avoid, running the CO2 purge cycle. Additionally, these approaches can include displaying a remaining time until initiation of the CO2 purge cycle, e.g., on a control panel or conventional control system display.

Various embodiments of the invention include a system which includes at least one computing device, where the at least one computing device is configured to: obtain an indication of a fault in an alternating current (AC) power supply to a hydrogen-cooled dynamoelectric machine system; determine a reserve power characteristic (e.g., a load profile such as an amount of stored energy, a rate of discharge, a voltage slope, etc.) of a reserve energy storage device; and extend a pre-purge cycle for the hydrogen-cooled dynamoelectric machine based upon the reserve power characteristic of the reserve energy storage device. Related computer program products and methods are also disclosed according to various embodiments of the invention. Additional embodiments include hardware components configured to monitor the reserve power characteristic of the reserve energy storage device.

Turning to FIG. 1, a schematic depiction of a system 2 is shown according to various embodiments of the invention. The system 2 is shown including various components, which can be connected in a variety of manners. In some cases, data connections (e.g., hard-wired data connections, wireless data connections or other electrical connections) are shown using dashed lines. Additionally, flow (e.g., of fluid) is indicated by solid lines having arrows. Mechanical coupling is illustrated using a thick, or bar-style line. As shown, the system 2 can include a hydrogen-cooled dynamoelectric machine ($H_2$ Dynamo) 4 which is operably connected (e.g., via a shaft 5) with a turbine 6. As described herein, according to various embodiments, the $H_2$ Dynamo 4 is connected to a pump/motor system 10, which can supply fluids (e.g., hydrogen, lube oil, seal oil, carbon dioxide, etc.) to the $H_2$ Dynamo 4 for performing various functions. The pump/motor system 10 has an associated power supply: where alternating current (AC) pumps in the pump/motor system 10 are electrically coupled with an AC power supply 12, while direct current (DC) pumps in the pump/motor system 10 are electrically coupled with an energy storage device 14 (e.g., a DC power source such as a DC battery). The energy storage device 14 in some cases can include a DC energy storage device, however, the energy storage device 14 can take any form capable of storing energy for use by the pump/motor system 10. For example, in some cases, the energy storage device 14 can include a flywheel, a fuel cell, or any other form of energy storage.

The DC pumps in the pump/motor system 10 can include a DC lube oil pump (DCLOP) and a DC seal oil pump (DCSOP). The system 2 can further include a purge unit 26, which can be configured to purge the $H_2$ Dynamo 4 of hydrogen in cases where the $H_2$ Dynamo 4 must be shut down. The purging of hydrogen from the $H_2$ Dynamo 4 is often performed as a safety measure, as the presence of hydrogen within the system presents certain combustion risks. The system can further include a hydrogen unit ($H_2$ unit) 15 for providing hydrogen to the $H_2$ Dynamo 4.

Additionally shown, the system 2 can include a monitoring system 20, which can be configured to monitor at least one of the $H_2$ Dynamo 4, the turbine 6, or the energy storage device 14. The monitoring system 20 can include a remote monitoring system 21 and/or a local monitoring system 23, where the remote monitoring system 21 is located at a distinct physical location (e.g., miles away) from the $H_2$ Dynamo 4. The system can further include an $H_2$ Dynamo control system 22, which can include a logical control system, and which may be part of at least one computing device (described further herein with reference to FIG. 4). The $H_2$ Dynamo control system 22 can be operably connected with monitoring device(s) 25 and other components shown and described herein via a conventional communications protocol 27 or other conventional wireless and/or hard-wired means.

Also shown, the system 2 can include the at least one monitoring device 25, which can include hardware for monitoring at least one of: an amount of electricity available in the energy storage device 14; an amount of electricity available from the AC supply 12; a state of health of the energy storage device 14, e.g., a bus voltage profile of the energy storage device 14, a discharge rate (e.g., current measurement) of the energy storage device 14, a load profile of the energy storage device 14; a state of health of the pump/motor system 10; etc. The monitoring device(s) 25 can include, for example, a bus voltage monitor or a current monitor. The monitoring devices 25 can be physically connected with at least one of the energy storage device 14, the AC supply 12 or the pump/motor system 10, e.g., via a hard-wired electrical connection. In various embodiments of the invention, the monitoring device is operably connected with the H2 Dynamo control system 22 (and computer systems described with reference to FIG. 4). In particular embodiments, the monitoring device 25 is electrically connected, e.g., hard wired, with the energy storage device 14. In various embodiments, the monitoring device(s) 25 can include a bus voltage monitor for determining the reserve power characteristic of the energy storage device 14.

In some particular cases, the monitoring system 20 is configured to monitor the energy storage device 14 to determine an amount of remaining power available to the pump/motor system (e.g., to the DC pumps) 10, as well as a state-of-health of the energy storage device 14. The monitoring system 20 (and several other components in FIG. 1) are coupled to the $H_2$ Dynamo control system 22, which can monitor operation of one or more of those components (e.g., independently or via the monitoring system 20). The $H_2$ Dynamo control system 22 can include, or be integrally connected with, a human-machine interface/display (HMI interface/display) 24, which can include a conventional interface such as a graphical user interface (GUI) allowing an operator (e.g., a human operator) to interact with the $H_2$ Dynamo control system 22. The $H_2$ Dynamo control system 22 can be configured to perform a variety of functions according to various embodiments of the invention. These functions may be best understood with reference to the flow diagram of FIG. 2.

Figure 2:
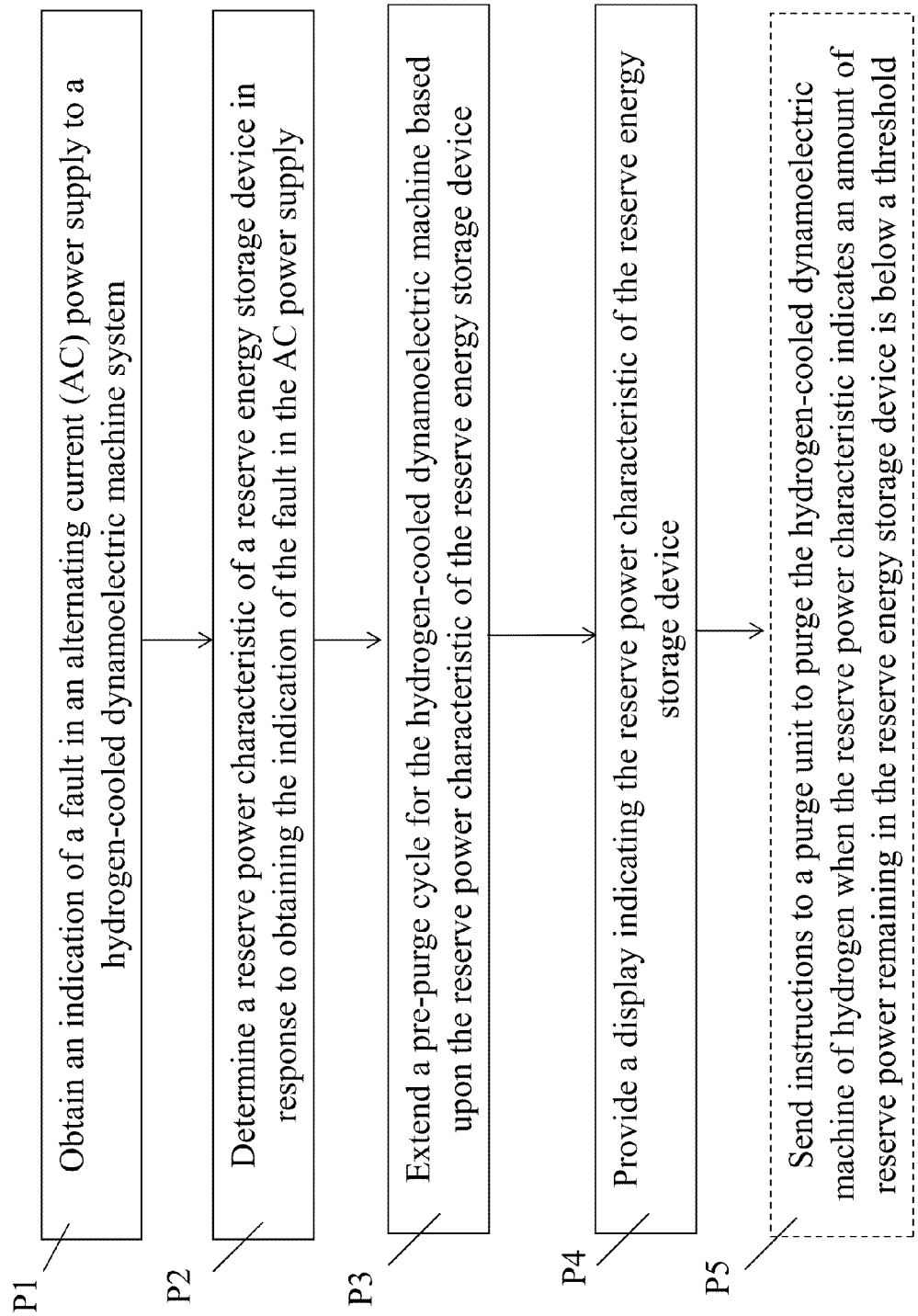
FIG. 2 shows a flow diagram illustrating processes according to various embodiments of the invention.

Turning to FIG. 2, a flow diagram is shown illustrating a method according to various embodiments of the invention. The method can include various processes, which can be performed in the order shown, or in any other order. Some of these processes are referenced in view of the system diagram of FIG. 1 and the environment of FIG. 4.

As shown in FIG. 2, various approaches according to embodiments of the invention can include the following processes:

Process P1: Obtain an indication of a fault in an alternating current (AC) power supply (AC supply 12) to a hydrogen-cooled dynamoelectric machine system ($H_2$ Dynamo 4) (e.g., an electrical generator system). This can include obtaining a signal (at the $H_2$ Dynamo Control System 22) from the AC supply 12 indicating that the AC supply 12 is experiencing a malfunction. This could also include obtaining a signal from one or more monitoring device 25 that the pump/motor system 10 (including, e.g., the AC pumps) is malfunctioning (e.g., from a lack of power supply). In other embodiments, the H$_2$ Dynamo control system 22 can monitor (on an intermittent or continuous basis) operations of one or both of the AC supply 12 or the pump/motor system 10 to diagnose a malfunction in one or more of these components. In any case, after obtaining an indication of a fault in the AC supply 12, the method may proceed to process P2.

Process P2: Determine a reserve power characteristic of a reserve energy storage device (energy storage device 14). In some cases, the determining of the reserve power characteristic in the energy storage device 14 is performed by the monitoring system 20 via one or more monitoring devices 25. In some particular cases, this can include utilizing one or more monitoring devices 25 to determine a reserve power characteristic such as at least one of a battery voltage level (e.g., DC voltage level), a battery voltage slope (e.g., DC voltage slope), a battery rate of discharge, etc. of the energy storage device 14. In various embodiments, the monitoring system 20 (and monitoring device(s) 25) obtains data about a state of the energy storage device, e.g., by monitoring the energy storage device 14 over a time after loss of AC supply 12 power.

Figure 3:
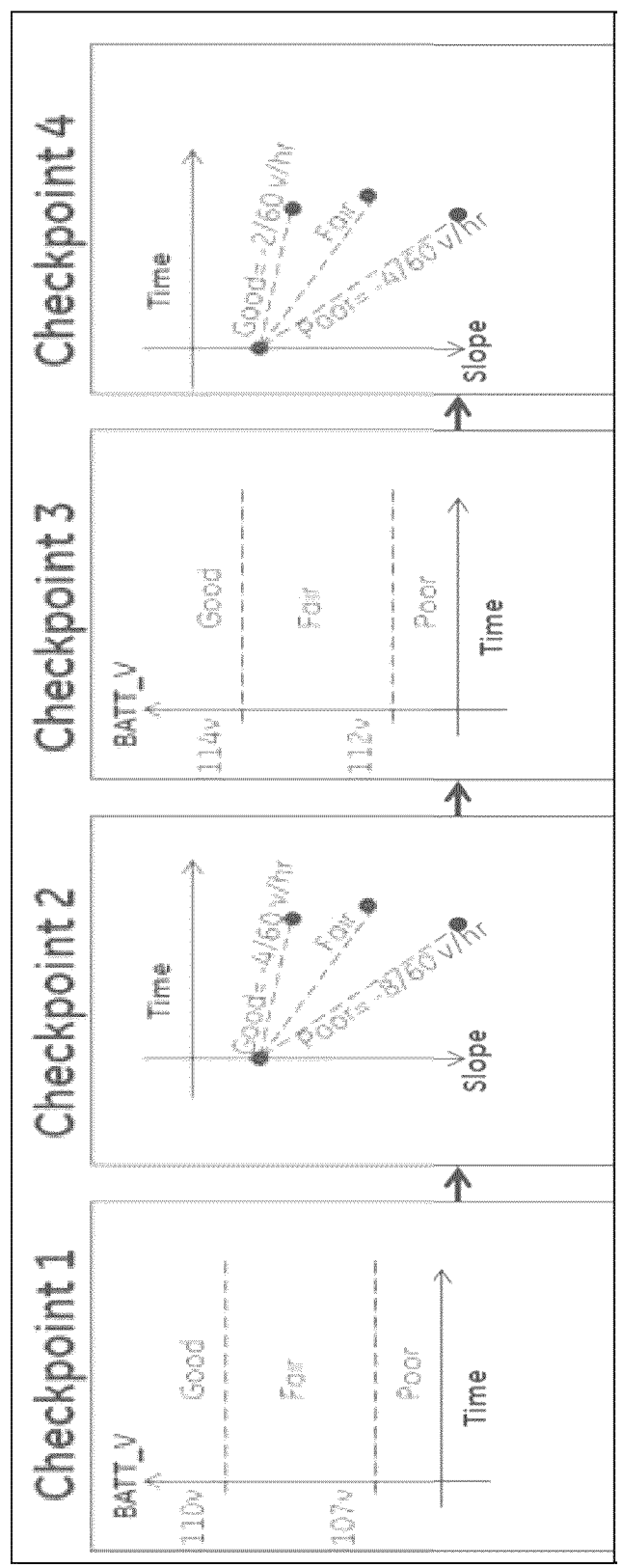
FIG. 3 shows illustrative views of DC power level evaluation checkpoints according to various embodiments of the invention.

FIG. 3 illustrates schematic views of various example "checkpoints" used by the monitoring system 20 to determine a reserve power characteristic of the energy storage device 14 after loss of power from the AC supply 12. These checkpoints are example query times (with associated evaluation parameters) for the energy storage device 14. It is understood that these checkpoints are merely illustrative, and are not intended to limit the teachings of any embodiments in any way. These example checkpoints include:

Checkpoint 1: At X (e.g., 20) seconds after loss of power from the AC supply 12, the energy storage device 14 is measured according to:
  Good>A volts;
  A volts>Fair>B volts; and
  Poor<C volts.

Checkpoint 2: At Y (e.g., 3) minutes after loss of power from the AC supply 12, the energy storage device 14 is measured according to:
  Good>D volts/hour (v/hr);
  D v/hr>Fair>E v/hr; and
  Poor<F v/hr.

Checkpoint 3: At Z (e.g., 30) minutes after loss of power from the AC supply 12, the energy storage device 14 is measured according to:
  Good>G volts;
  G volts>Fair>H volts; and
  Poor<I volts.

Checkpoint 4: At T (e.g., 33) minutes after loss of power from the AC supply 12, the energy storage device 14 is measured according to:
  Good>J v/hr;
  J v/hr>Fair>K v/hr; and
  Poor<K v/hr.

Returning to FIG. 2, with continuing reference to FIG. 1, it is further understood that Process P2 can include determining a load on the H$_2$ Dynamo 4, e.g., my measuring one or more conditions including electrical output, shaft speed, etc.

With continuing reference to the flow diagram, process P3 can include: extending a pre-purge cycle (e.g., the time for the DC LOP 16) for the hydrogen-cooled dynamoelectric machine (H$_2$ Dynamo 4) based upon the reserve power characteristic of the energy storage device 14. That is, the H$_2$ Dynamo control system 22 can compare the reserve power characteristic (e.g., battery voltage level (e.g., DC voltage level), a battery voltage slope (e.g., DC voltage slope), a battery rate of discharge, etc.) of the energy storage device 14 to a predetermined standard/scale, and extend the time in which the pump/motor system 10 provides lube oil to the H$_2$ Dynamo 4 to extend the pre-purge cycle. As described with reference to Process P2 and FIG. 3, the H$_2$ Dynamo control system 22 can determine a state of the energy storage device 14 (via one or more reserve power characteristics), and estimate an amount of power available to run the pump/motor system 10 (including, e.g., DC pumps), in particular, a DC lube oil pump. In some cases, the H$_2$ Dynamo control system 22 can consider the determined load on the H$_2$ Dynamo 4 when extending the pre-purge cycle. That is, where the load on the H$_2$ Dynamo 4 is relatively low, the H$_2$ Dynamo control system 22 may determine that the energy storage device 14 will last relatively longer (in time terms) than when the load on the H$_2$ Dynamo 4 is relatively high. In these cases, the H$_2$ Dynamo control system 22 can reasonably extend the pre-purge cycle for a longer time than when the load on the H$_2$ Dynamo 4 is higher.

Following process P3, according to various embodiments, process P4 can include providing a display (e.g., on HMI 24) indicating the amount of energy storage (e.g., DC energy storage) remaining in the reserve energy storage device (energy storage device 14). In some embodiments, this can include providing the display on a time basis, e.g., in terms of hours, minutes and seconds of estimated time remaining before the energy storage device 14 is substantially depleted. This process can further include displaying an estimated time until purge is required (see process P5), which may differ from the time remaining before the energy storage device 14 is substantially depleted.

Following process P4, in some embodiments, process P5 can include: sending instructions to the purge unit 26 to purge the H$_2$ Dynamo 4 of hydrogen. This can include pumping carbon dioxide into the H$_2$ Dynamo 4 to force the hydrogen from the system. This process can also include sending instructions to prevent the H$_2$ unit 15 from supplying further hydrogen to the H$_2$ Dynamo 4. This process is performed only in certain circumstances (as indicated by dashed box), for example, where the energy storage device 14 depletes or substantially depletes its power reserve. That is, various embodiments of the invention are directed toward extending the pre-purge cycle such that the H$_2$ Dynamo 4 need not be purged, thereby saving the time and expense of performing process P5. However, it is understood that in some cases, the energy storage device 14 will be depleted before AC supply 12 can be restored, and in these cases, the H$_2$ Dynamo 4 may be purged.

It is understood that the processes described herein can provide for various benefits over the conventional control mechanisms for hydrogen-cooled dynamoelectric machines. For example, the HMI 24 can provide an operator (e.g., a human operator) with a real time display of the time remaining until purge. The HMI 24 can further provide historical data (e.g., previous purges, estimated time frames, etc.) about the H$_2$ Dynamo 4. Having a display of the estimated time until purge available on the HMI 24 (via the H$_2$ Dynamo control system 22) provides a variety of benefits, for example:

1) Operator(s) have more time to take corrective action and restore loss of AC supply 12, and return the H$_2$ Dynamo 4 to a ready-to-start state, thereby preventing a purge. Preventing a purge can avoid the economic loss of hydrogen and carbon dioxide, improve the H$_2$ Dynamo 4 reliability and availability, and promote the H$_2$ Dynamo 4 along a priority dispatch list.

2) Maintenance personnel and planners can better understand the state of health of the energy storage device 14 (and associated batteries), and create a more data-driven maintenance or replacement regiment for the batteries. This data can help in avoiding timely and expensive deep discharge battery testing.

Figure 4:
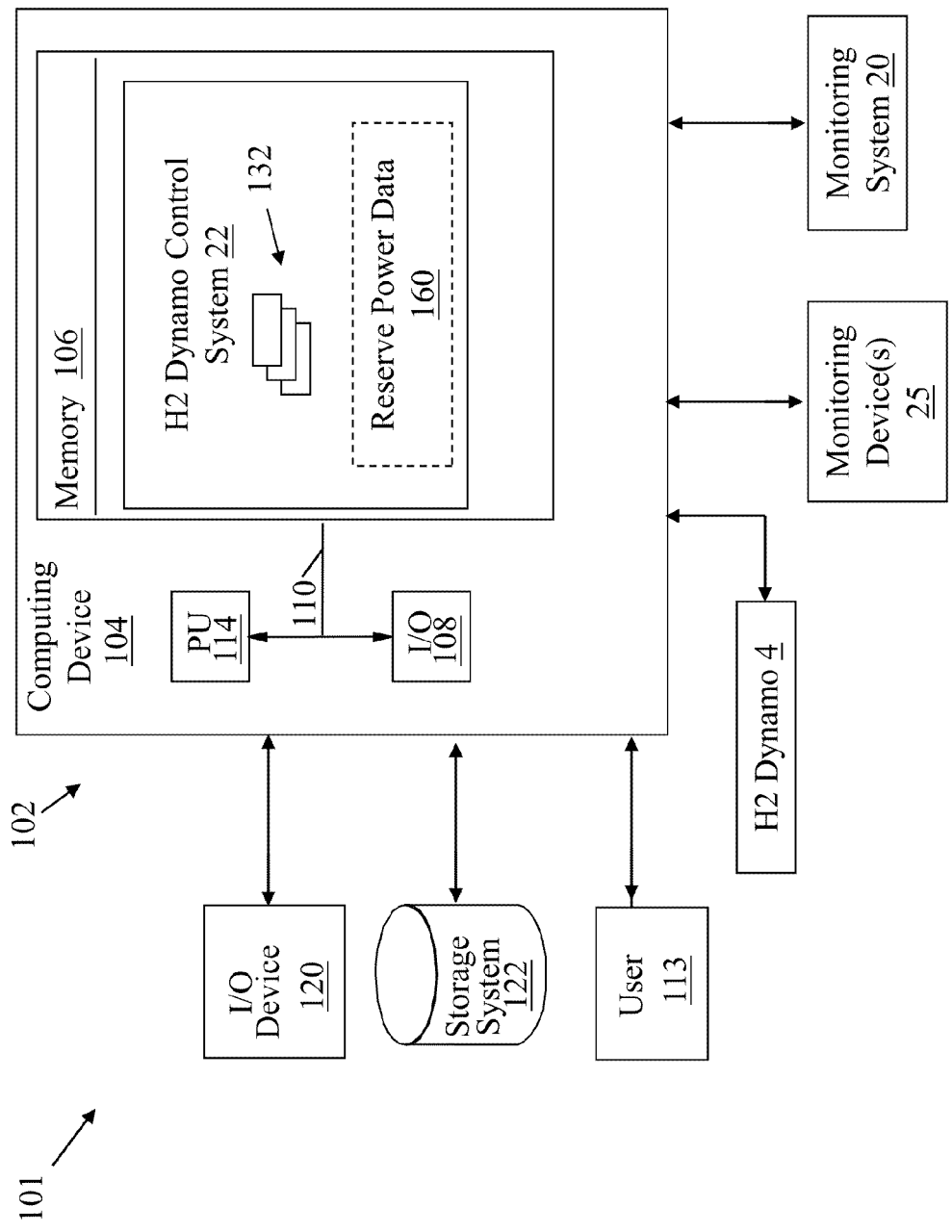
FIG. 4 shows an environment including systems according to various embodiments of the invention.

FIG. 4 depicts an illustrative environment 101 for performing the control system processes described herein with respect to various embodiments. To this extent, the environment 101 includes a computer system 102 that can perform one or more processes described herein in order to control operation of a hydrogen-cooled dynamoelectric machine ($H_2$ Dynamo) 4. In particular, the computer system 102 is shown as including an $H_2$ Dynamo control system 22, which makes computer system 102 operable to control operation of a hydrogen-cooled dynamoelectric machine by performing any/all of the processes described herein and implementing any/all of the embodiments described herein.

The computer system 102 is shown including a computing device 104 (e.g., a processing component having one or more processors, or PUs 114), a storage component 106 (e.g., a storage hierarchy), an in-put/output (I/O) component 108 (e.g., one or more I/O interfaces and/or devices such as I/O devices 120), a communications pathway 110, and an external storage system 122. In general, the processing component 104 executes program code, such as the $H_2$ Dynamo control system 22, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O de-vices, which enable a human user 113 to interact with the computer system 102 and/or one or more communications devices to enable a system user 112 to communicate with the computer system 102 using any type of communications link. To this extent, the $H_2$ dynamo control system 22 can manage a set of interfaces (e.g., graphical user interface(s), application program interface, etc.) that enable human and/or system users 113 to interact with the $H_2$ dynamo control system 22. Further, the $H_2$ dynamo control system 22 can manage (e.g., store, retrieve, create, manipulate, organize, present, etc.) data, such as reserve power data 160 using any solution. The $H_2$ dynamo control system 22 can additionally communicate with the $H_2$ dynamo 4, e.g., via wireless and/or hardwired means.

In any event, the computer system 102 can comprise one or more general purpose computing articles of manufacture (e.g., computing devices) capable of executing program code, such as the $H_2$ dynamo control system 22, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the $H_2$ dynamo control system 22 can be embodied as any combination of system software and/or application software.

Further, the $H_2$ dynamo control system 22 can be implemented using a set of modules 132. In this case, a module 132 can enable the computer system 102 to perform a set of tasks used by the $H_2$ dynamo control system 22, and can be separately developed and/or implemented apart from other portions of the $H_2$ dynamo control system 22. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of $H_2$ dynamo control system 22 fixed thereon (e.g., one or more modules 132). However, it is understood that the computer system 102 and $H_2$ dynamo control system 22 are only representative of various possible equivalent computer systems that may perform a process described herein. To this extent, in other embodiments, the functionality provided by the computer system 102 and $H_2$ dynamo control system 22 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as reserve power data 160 using any solution. The computer system 102 can generate reserve power data 160, from one or more data stores, receive reserve power data 160, from another system such as the $H_2$ dynamo 4 and/or the monitoring system 20, send reserve power data 160 to another system, etc.

While shown and described herein as a method and system for controlling a $H_2$ dynamo 4, e.g., based upon an available amount of available DC power, it is understood that aspects of the invention further provide various alternative embodiments. For example, in one embodiment, the invention provides a computer program fixed in at least one computer-readable medium, which when executed, enables a computer system to control a $H_2$ dynamo 4. To this extent, the computer-readable medium includes program code, such as the $H_2$ dynamo control system 22 (FIGS. 1 and 4), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the H₂ dynamo control system 22 (FIGS. 1 and 4), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for controlling a H₂ dynamo 4 (e.g., in response to an anticipated amount of solar obstruction). In this case, a computer system, such as the computer system 102 (FIG. 4), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

In any case, it is understood that according to various embodiments disclosed herein, the technical effect of the invention is to control operation of a hydrogen-cooled dynamoelectric machine.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It is further understood that the terms "front" and "back" are not intended to be limiting and are intended to be interchangeable where appropriate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system comprising:
   at least one computing device configured to perform the following:
   obtain an indication of a fault in an alternating current (AC) power supply to a hydrogen-cooled dynamoelectric machine system;
   determine a reserve power characteristic of a reserve energy storage device in response to obtaining the indication of the fault in the AC power supply; and
   extend a pre-purge cycle for the hydrogen-cooled dynamoelectric machine system based upon the reserve power characteristic of the reserve energy storage device, wherein the pre-purge cycle includes a time prior to a purge process, the purge process including purging the hydrogen-cooled dynamoelectric machine system of hydrogen.

2. The system of claim 1, wherein the at least one computing device is further configured to provide a display indicating the reserve power characteristic of the reserve energy storage device.

3. The system of claim 2, wherein the reserve power characteristic includes an amount of reserve power, and wherein the display indicates the amount of reserve power remaining in the reserve energy storage device on a time basis.

4. The system of claim 1, wherein the determining of the reserve power characteristic of the reserve energy storage device includes determining at least one of a battery voltage level or a battery voltage slope of the reserve energy storage device.

5. The system of claim 1, wherein the at least one computing device is further configured to determine a load on the hydrogen-cooled dynamoelectric machine system.

6. The system of claim 5, wherein the extending of the pre-purge cycle is further based upon the determined load on the hydrogen-cooled dynamoelectric machine system.

7. The system of claim 1, wherein the at least one computing device is further configured to send instructions to a purge unit to purge the hydrogen-cooled dynamoelectric machine system of hydrogen when the reserve power characteristic indicates an amount of reserve power remaining in the reserve energy storage device is below a threshold.

8. The system of claim 1, further comprising a monitoring system operably connected with the at least one computing device and the reserve energy storage device, the monitoring system for obtaining data about a state of the reserve energy storage device.

9. The system of claim 1, wherein the reserve power characteristic includes at least one of an energy storage status or a rate of discharge of the reserve energy storage device.

10. The system of claim 1, wherein the reserve energy storage device is a direct current (DC) energy storage device.

11. The system of claim 1, further comprising:
    a monitoring device operably connected with the at least one computing system, the monitoring device being electrically connected with the reserve energy storage device,
    wherein the monitoring device includes a bus voltage monitor for determining the reserve power characteristic of the reserve energy storage device.

12. A computer-implemented method comprising:
    obtaining an indication of a fault in an alternating current (AC) power supply to a hydrogen-cooled dynamoelectric machine system;
    determining a reserve power characteristic of a reserve energy storage device in response to obtaining the indication of the fault in the AC power supply; and
    extending a pre-purge cycle for the hydrogen-cooled dynamoelectric machine system based upon the reserve power characteristic of the reserve energy storage device, wherein the pre-purge cycle includes a time prior to a purge process of purging the hydrogen-cooled dynamoelectric machine system of hydrogen.

13. The method of claim 12, further comprising displaying an indication of the reserve power characteristic of the reserve energy storage device.

14. The method of claim 13, wherein the reserve power characteristic includes an amount of reserve power, and wherein the displaying includes indicating the amount of reserve power remaining in the reserve energy storage device on a time basis.

15. The method of claim 12, wherein the determining of the reserve power characteristic of the reserve energy storage device includes determining at least one of a battery voltage level or a battery voltage slope of the energy storage device.

16. The method of claim 12, further comprising determining a load on the hydrogen-cooled dynamoelectric machine system, wherein the extending of the pre-purge cycle is further based upon the determined load on the hydrogen-cooled dynamoelectric machine system.

17. The method of claim 12, further comprising sending instructions to a purge unit to purge the hydrogen-cooled dynamoelectric machine system of hydrogen when the reserve power characteristic indicates an amount of reserve power remaining in the reserve energy storage device is below a threshold.

18. A computer program product stored on a non-transitory computer readable medium, which when executed by at least one computing device, causes the at least one computing device to:
- obtain an indication of a fault in an alternating current (AC) power supply to a hydrogen-cooled dynamoelectric machine system;
- determine a reserve power characteristic of a reserve energy storage device in response to obtaining the indication of the fault in the AC power supply; and
- extend a pre-purge cycle for the hydrogen-cooled dynamoelectric machine system based upon the reserve power characteristic of the reserve energy storage device, wherein the pre-purge cycle includes a time prior to a purge process, the purge process including purging the hydrogen-cooled dynamoelectric machine system of hydrogen.

19. The computer program product of claim 18, which when executed, further causes the at least one computing device to send instructions to a purge unit to purge the hydrogen-cooled dynamoelectric machine system of hydrogen when the reserve power characteristic indicates an amount of reserve power remaining in the reserve energy storage device is below a threshold.

* * * * *